United States Patent

[11] 3,612,692

| [72] | Inventors | Robert W. Kruppa<br>Hopewell Junction;<br>Ernest S. Ward, Fishkill, both of N.Y. |
|---|---|---|
| [21] | Appl. No. | 777,556 |
| [22] | Filed | Nov. 21, 1968 |
| [45] | Patented | Oct. 12, 1971 |
| [73] | Assignee | International Business Machines Corporation<br>Armonk, N.Y. |

[54] DIELECTRIC FILM THICKNESS MONITORING AND CONTROL SYSTEM AND METHOD
9 Claims, 7 Drawing Figs.

[52] U.S. Cl. .................................................. 356/108, 356/114
[51] Int. Cl. .................................................. G01b 9/02, G01r 21/40
[50] Field of Search ........................................ 356/106–113

[56] References Cited
UNITED STATES PATENTS
3,099,579  7/1963  Spitzer et al. ................. 356/106
3,238,839  3/1966  Day, Jr. ........................ 356/106
3,488,123  1/1970  Nichols ........................ 356/106

OTHER REFERENCES
Position of the Bands of Fabry-Perot Type Filters as a Function of Angle of Incidence; Griffith; JOSA, vol. 40, pg. 261
Reflection & Transmission Interference Filters; Hadley et al.; JOSA, vol. 37 No. 6, pg. 451–465

*Primary Examiner*—Ronald L. Wibert
*Assistant Examiner*—Conrad Clark
*Attorney*—Sughrue, Rothwell, Mion, Zinn & Macpeak

ABSTRACT: An automatic thickness monitoring and control system and method for monitoring the growth of a dielectric film on a reflective substrate such as a silicon wafer during an RF sputtering deposition process and for stopping the deposition process when the film reaches a predetermined thickness. The successive minima (or maxima) in the interference pattern of light reflected from the wafer are counted to determine the film thickness and the sputtering is stopped at a predetermined count. In another embodiment, sputtering is stopped by interpolation between counts.

PATENTED OCT 12 1971 3,612,692

INVENTORS
ROBERT W. KRUPPA
ERNEST S. WARD

BY *Sughrue, Rothwell, Mion, Zinn & Macpeak*

ATTORNEYS

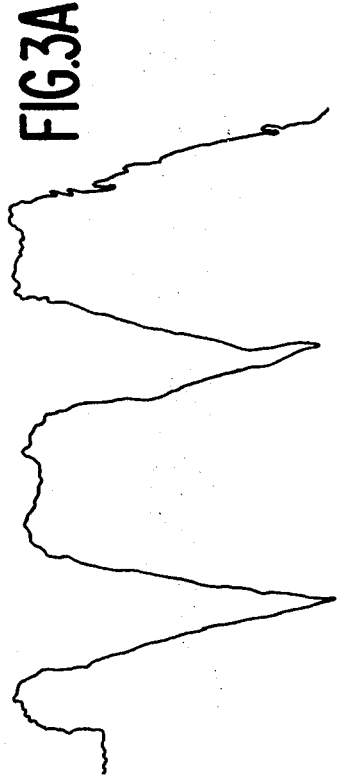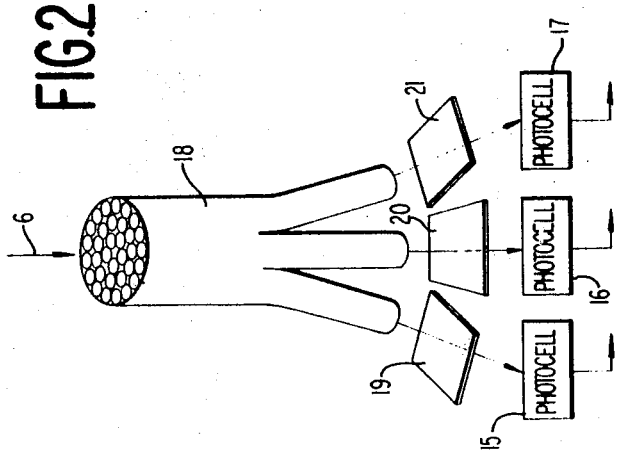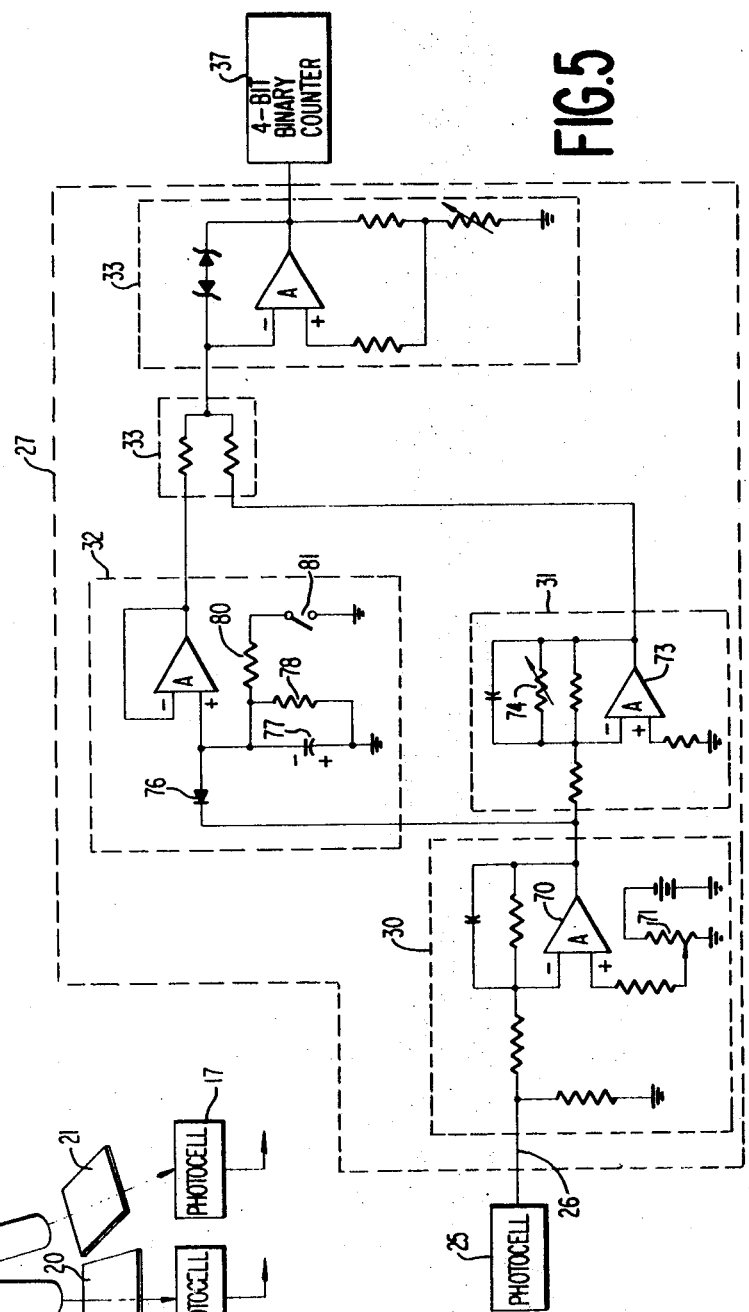

DIELECTRIC FILM THICKNESS MONITORING AND CONTROL SYSTEM AND METHOD

BACKGROUND OF THE INVENTION

1. Field of the Invention

This invention relates to a thickness measuring and control device and method. More particularly, it relates to an automatic thickness monitoring and control system and method wherein the growth of a film on a substrate during a deposition process is monitored by counting successive minima (or maxima) in a light beam reflected from the substrate.

2. Description of the Prior Art

In the prior art, the thickness of a film after deposition on a substrate has been determined manually by using interference techniques.

It is also known, as shown in U.S. Pat. No. 3,059,611, to continuously monitor the growth of a film on a substrate by measuring successive minima in light transmitted through the substrate. This prior art method has the disadvantage that the substrate must be transparent to light of the wavelength used to produce the minima.

In prior art systems which have included a light source, an RF sputtering system, means for directing light from the light source to a substrate subjected to the sputtering, and means for detecting the light from the source after the light has been modified by interaction with the sputtered substrate, it has been quite difficult to avoid detection of background light generated inherently by the sputtering system. Complex chopping and filter systems have been used to separate source light from background light.

SUMMARY OF THE INVENTION

The invention is an automatic thickness monitor for monitoring the growth of a dielectric film on a reflective substrate such as a silicon wafer during deposition by RF sputtering of dielectric material onto the wafer. The monitor automatically terminates the deposition process at the desired thickness of the film.

A small diameter, high-intensity beam of collimated light is directed onto the surface of the silicon wafer which is the substrate for the dielectric film. Light reflected from the surface of the wafer, and from the film is directed to a photocell to produce an electrical signal. The intensity of the reflected light depends upon the thickness of the sputtered film on the wafer. Because of light wave interference, the intensity of the reflected light goes through a succession of maxima and minima points as the thickness of the deposited dielectric film increases. The thickness of film between successive ones of these maxima or minima points can be accurately and easily calculated in terms of the constant wavelength used, the fixed angle of incidence, and the refractive index of the film. Because the minima points are more accurately defined than the maxima points, greater accuracy is generally achieved by calculating the thickness between successive minima.

The electrical signal produced by the photocell simulates the interference pattern and is used for electronic counting of these minima to stop the sputtering at the desired dielectric thickness value. The use of reflected light overcomes a disadvantage in the prior art in that the wavelength of the light is not limited to those wavelengths to which the wafer is transparent.

In a monitor according to the present invention, the angle $\alpha$ of incidence must be greater than about 75°, when measured from the normal to the substrate surface, because of the practical structural problems of arranging the system for a lesser angle. Since this smallest usable incidence angle is larger than the Brewster's angle for the film, the parallel component of the electric vector in the electromagnetic (e.g., light) wave reverses phase and thereby causes distortion and irregularities in the interference pattern. This invention eliminates the reflectivity anomaly by appropriate polarization.

The invention also reduces the complexity of the optics and detection electronics by eliminating the need for chopping the incident light and filtering the reflected light to reduce background effects. The use of appropriate polarization reduces the background effect from the sputter light.

The invention has another advantage. Through the use of a spider fiber optics bundle, having a common input end and several separate output legs, it can direct the reflected light simultaneously to several different matched photocell-optical filter pairs. Each of the pairs has an appropriately selected peak wavelength response to allow a phase difference between the minima (or maxima) measured by different pairs. With enough of these photocells to provide a minima from some one of the pairs for every few degrees of phase change, the resulting large number of discrete minima (or maxima) indications provide a nearly continuous thickness indication without the necessity for interpolation.

BRIEF DESCRIPTION OF THE DRAWINGS

FIG. 2 is a schematic diagram of the spider optical fiber bundle, an optical arrangement to allow the invention to be used with a plurality of wavelengths of light.

FIG. 3A is a graph showing the interference anomoly and glow discharge background light without appropriate polarization.

FIG. 5 is a schematic diagram of a minimum detector which may used in the electrical equipment illustrated in FIG. 4.

DESCRIPTION OF THE PREFERRED EMBODIMENTS

Figure 1A:
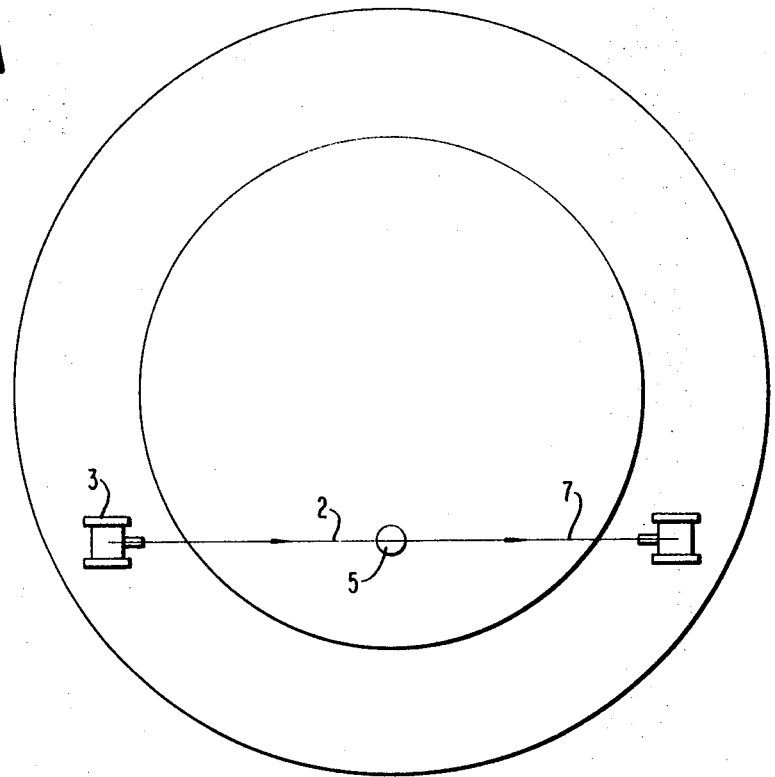
FIGS. 1A and 1B are schematic top and front views respectively of the mechanical and optical portions of a thickness monitor according to the present invention.
Figure 1B:
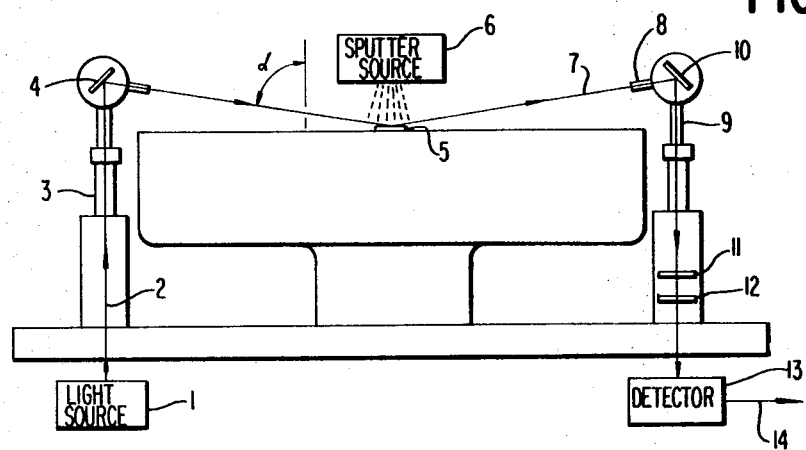

FIGS. 1A and 1B illustrate the mechanical and optical portions of a thickness monitor according to the present invention. A light source 1, which may be a 12 volt AC tungsten iodine filament lamp, generates a vertically projected collimated light beam 2 having a diameter preferably not greater than about half a centimeter.

The light beam 2 is passed through a periscope 3 to a periscope mirror 4, which reflects the beam onto wafer 5 with a critical incidence angle $\alpha$ from the normal to the wafer plane in the range of 75 to 80 degrees.

Wafer 5 reflects light beam 2, which has an intensity which depends upon the minima and maxima effects caused by the variation in thickness of the dielectric coating on wafer 5. As illustrated in FIGS. 1A and 1B, the wafer 5 is in position for continued sputtering by sputter source 6 so that the intensity of reflected beam 7 varies.

A narrow diameter portion of the reflected beam passes through a small opening 8 into a periscope 9. Reflected beam 7 is reflected by a periscope mirror 10 in periscope 9 onto the detector package consisting of polarizer, spider-fiber bundle (optional), optical interference filter and photodetector.

The reflected beam passes through polarizer 11 which linearly and perpendicularly polarizes the beam. The polarized beam is filtered by a filter 12 of selected peak wavelength response. The filtered light is received by photodetector 13, which may be a photocell, and which generates an electrical output signal 14.

It is not necessary that the periscopes be used. An alternative embodiment (not illustrated) provides transparent openings through the sides of the sputtering chamber for the admission of the collimated light beam and for the exit of the reflected light.

FIG. 2 illustrates one embodiment of the arrangement of detector 13. It includes three photocells 15–17, each receiving reflected light from beam 7 through a bundle 18 of optical fibers arranged in the beam path. The fibers are split into three groups and the light from each group is passed through one of three filters 19–21, each filter having a different peak wavelength response.

Because of the difference in the thickness for which minima and maxima occur for light of different wavelengths, the arrangement of FIG. 2 will provide substantially continuous, discrete thickness indications. That is, the indications will be given in small increments. Further electronic interpolation may be used between minima points to provide for finer thickness selection within the small increments. Of course, where less than continuous, discrete thickness indication is needed, a single filter and photocell can be used. The photocell corresponding most closely to the wavelength having a minima for the desired film thickness can be used. This photocell is connected to the circuit of FIG. 4, preferably for operation in the discrete mode, as more fully explained in connection with FIG. 4.

Figure 3B:
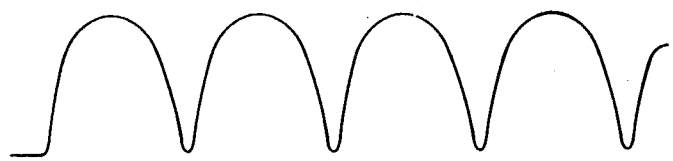
FIG. 3B is a graph of a typical curve after appropriate polarization showing the interference pattern as recorded during deposition at a constant rate.

FIGS. 3A and 3B are graphs of a typical number of cycles of maxima and minima as measured by a photocell respectively without and with appropriate polarization for filtering out background light. These graphs represent the optical intensity of the light as simulated by the electrical output signal from the photocell. The curve of FIG. 3B is preferably for measurement purposes.

The formula used to calculate the thickness $T$, at the successive minima is:

$$T = \frac{n\lambda}{2\sqrt{u^2 - \sin^2 \phi}}$$

where $\lambda$ is the wavelength of the incident light beam, $u$ the refractive index of the film, $\Phi$ the fixed incidence angle of the beam onto the substrate, $n$ the order of interference as determined by the number of minima counted, and $T$ is the film thickness.

Figure 4:
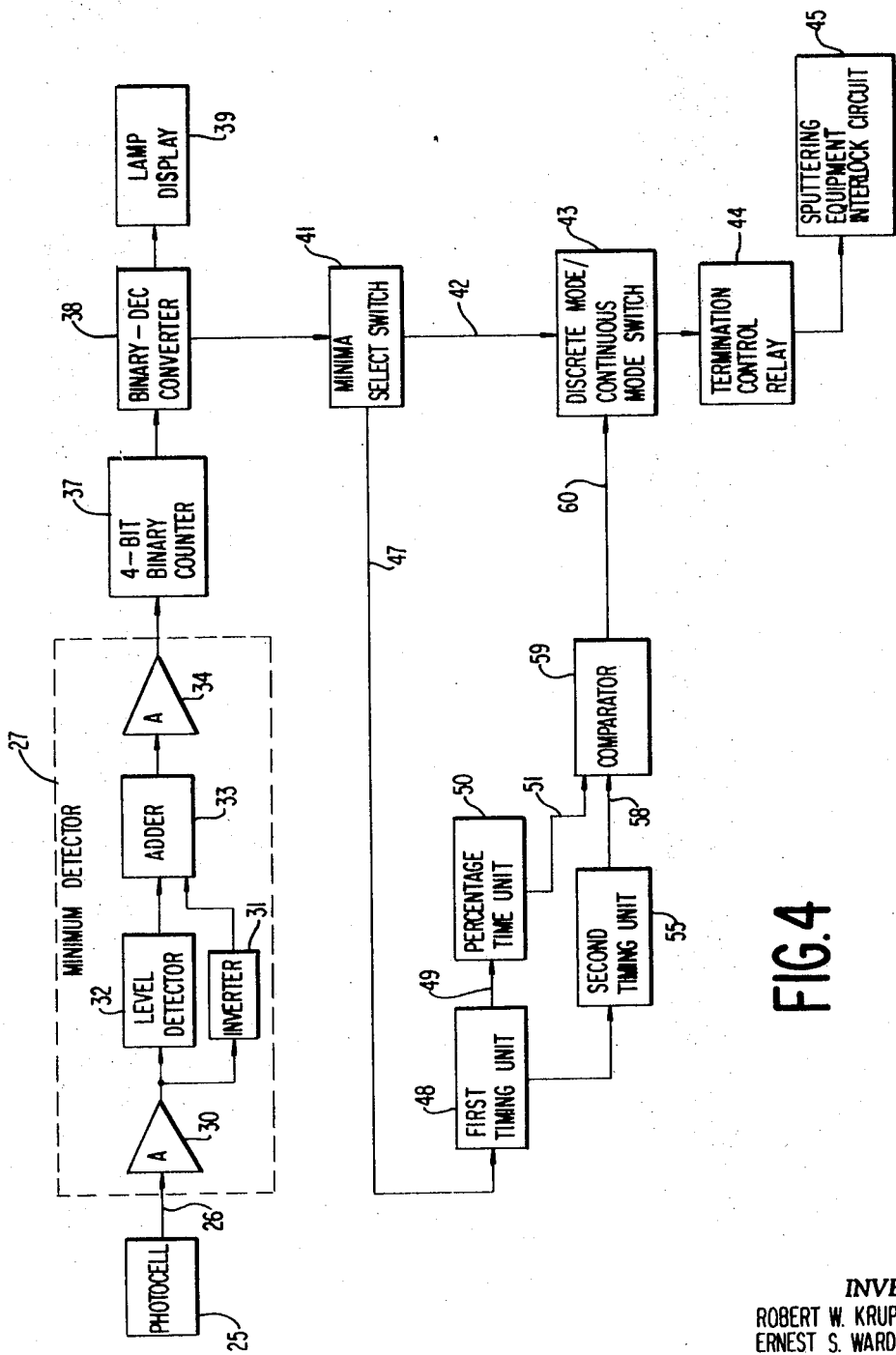
FIG. 4 is a schematic block diagram of the electrical equipment used in connection with the optical equipment of FIG. 1 for monitoring and control of film thickness.

In FIG. 4, photocell 25, corresponding to one of the photocells in detector 13, generates an electrical signal on line 26. This electrical signal, representing the interference pattern, is applied to the input of a minimum detector 27. The function of the minimum detector is to amplify the electrical signal from line 26, detect the minima points at their occurrence, and to provide an output pulse when each minima point is detected.

The signal on line 26 is applied to an amplifier 30 to provide an amplified output signal which is applied to a level detector 32 and an inverter 31. Level detector 32 receives an input signal and holds the lowest value of that signal received to provide an output signal to adder 33 equal to that lowest value. The level detector has a time constant for discharging the previous low value of signal which is long enough to allow minima detection but short enough not to mask later minima.

Inverter 31 also applies an output signal to adder 33. The inverter output is of the same magnitude but of opposite polarity to that of the signal applied to a level detector 32. Thus, before the minima is reached, the adder 33 has two inputs, equal in magnitude but opposite in polarity, causing the adder output signal to be zero. But after the minima is reached, the level detector holds the minima, while the inverter output rises. This difference in magnitude of the adder input signals causes the adder output signal to assume a value other than zero. The adder output signal is applied to the input of high-gain amplifier 34. Amplifier 34 generates an output signal with a sharp transition, for example from −10 volts to +10 volts, at the instant that the adder signal becomes nonzero.

The output from amplifier 34 becomes the output of the minimum detector 27 and is applied to a four-bit binary counter 37. Counter 37 counts the sharp transitions-indicating minima points.

The binary counter 37 receives the pulse from the minimum detector after the detection of each minima occurrence. The counter preferably consists of "+AND" logic circuits connected to form triggers, as opposed to conventional triggers. This method is considered to be less susceptible to noise levels due to the RF, flow discharge background, or line spikes. The counter is decoded using "+AND" logic circuits to give a binary count from 1 to 15 when the proper binary conditions are satisfied. Thus, the binary counter counts the number of pulses occurring and delivers its binary count to a binary-to-decimal converter 38. The converter counts the number of pulses occurring and decodes the binary count to decimal numbers. Each binary-to-decimal decoder circuit drives one of 15 indicator-light drivers in a lamp display unit 39. The sixteenth pulse resets the counter, at which time no light will be on.

The converter 38 is also connected to a minima select switch 41. The minima select switch is preset to the desired number of minima corresponding to the desired thickness of the dielectric film on the wafer. When the decimal count from converter 38 reaches the value corresponding to the minima select switch position, a signal is generated on line 42. The signal on line 42 is applied to a discrete mode/continuous mode switch 43. Switch 43 has the function of selecting whether the equipment operates in a purely counting mode of operation or whether it can interpolate thicknesses between counts of minima.

When switch 43 is in the DISCRETE MODE position, a termination control relay 44 is energized by a signal from line 42 indicating that the count is reached. This action opens up an interlock circuit 45 and terminates the sputtering process.

When the switch is in the CONTINUOUS MODE, the signal on line 42 is not used. Minima select switch 41 produces another signal on line 47 similar to that on line 42, but containing an indication of the next-to-last minima as well as the last minimal These indications are respectively called the next-to-last count signal and the last count signal. The signal on line 47 is applied to a first timing unit 48.

When the first timing unit 48 receives the next-to-last count signal, it begins integration at a constant rate to generate a voltage which is a linear function of time. When the first timing unit receives the last count signal, it ceases integration, holds the final voltage value, and applies this final voltage value to line 49.

Line 49 supplies an input to a percentage time unit 50, which may be a potentiometer. The purpose of percentage time unit 50 is to predetermine the additional fraction of a minima-to-minima cycle over which sputtering will be continued. This additional sputtering is done to interpolate thicknesses between the thicknesses at which successive minima occur. Since it is assumed that sputtering takes place at a fairly constant rate (clearly illustrated by FIGS. 3A and 3B) during a given deposition, this interpolation in time is equivalent to interpolation in thickness. Percentage time unit 50 provides a voltage output signal on line 51, which is proportional to the additional sputtering time needed.

When the last count signal is received on line 47, a second timing unit 55 begins an integration process. There may be a gating signal applied on line 56 to the second timing unit to determine that the signal received corresponds to the last minima. Alternatively the second timing unit could be primed by the next-to-last count signal to be operated by the last count signal, or the signals could be delivered on separate lines.

The second timing unit integrates to generate an output signal on line 58 which increases at the same rate as the signal from the first timing unit. The signals on lines 51 and 58 are applied to a comparator 59. When the comparator determines that its two input signals are equal, it generates an output signal on line 60 to indicate this equality.

The signal on line 60 is applied through the discrete mode/continuous mode switch 43 to termination control relay 44, which operates the sputtering equipment interlock circuit 45, thereby stopping the sputtering process.

The first and second timing units may be operational amplifier integrators with hold circuits, or they may be motor-driven potentiometers.

FIG. 5 is a general schematic diagram of a minimum detector 27 usable in the embodiment of FIG. 4. The signal on line 26 is applied to amplifier 30 to generate an output signal which is applied to inverter 31 and level detector 32, as in FIG. 4. The outputs of the level detector and the inverter are applied to adder 33 to generate a comparison signal applied to amplifier 34 also as in FIG. 4.

Amplifier 30 is conventional and includes an operational amplifier 70 and a zeroing potentiometer 71. Inverting amplifier 31 is also conventional and includes an operational amplifier 72 and an adjustable feedback resistor 74 for insuring unity inversion.

Level detector 32 includes a diode 76, a capacitor 77 and a high-valued resistor 78 connected to detect minima. Resistor 78 insures that capacitor 77 discharges slowly. Resistor 80 and reset switch 81 serve to reset the level detector for beginning a new measurement.

It is obvious that this system can also be used to monitor and control the growth of any transparent film which is continuously deposited on any sort of reflective substrate, but in the preferred embodiment, it is used to monitor and control the growth of a dielectric film deposited by sputtering on a semiconductor wafer, as described.

Although the embodiment disclosed counts successive minima, it would be possible, although less accurate, to count successive maxima, with obvious modifications of the minimum detector 27. The remaining circuitry will be the same whether the extrema points detected are maxima or minima.

Although the embodiment disclosed measures the thickness of the dielectric film as it is added by sputter deposition, the system is also capable of measuring the thickness of the film which is removed by sputter etching or other possible forms of etching or film removal.

While the invention has been particularly shown and described with reference to a preferred embodiment thereof, it will be understood by those skilled in the art that various changes in form and details may be made therein without departing from the spirit and scope of the invention.

What is claimed is:

1. An optical thickness-monitoring system for determining the thickness of a transparent film situated on the surface of a reflective substrate while the thickness of said film is being varied by an RF sputtering process comprising:
    a. means for directing an incident beam of collimated light onto said surface, to produce a reflected beam of light having parallel and perpendicular polarization components and an intensity which varies with time in a cyclic pattern according to the optical interference effect caused by the variation in thickness of said film, said cyclic pattern including periodic instants of intensity at each of two types of extrema points,
    b. polarization analyzer means for transmitting only the perpendicularly polarized component of said reflected beam.
    c. light-sensitive means receiving said polarized reflected beam for generating an electrical signal having a magnitude varying according to said intensity, and
    d. indicator means responsive to said electrical signal for indicating the total number of said instants of intensity at at least one type of said two types of extrema points which have occurred since the variation in the thickness of said film was initiated.

2. A control system including the monitoring system according to claim 1 and further comprising:
    means responsive to said indicator means for causing the variation in the thickness of said film to cease when said total number reaches a predetermined number.

3. A control system including the monitoring system according to claim 1 and further comprising:
    a. means responsive to the time interval between two successive ones of said periodic instants for generating a first time signal proportional to said time interval,
    b. means for generating a last count signal when said total number reaches a predetermined number,
    c. means responsive to said last count signal proportional to elapsed time since said last count signal, and
    d. means for comparing said second time to said last count signal with a predetermined part of said first time signal and responsive to the results of the comparison for causing the variation in the thickness of said film to cease.

4. A system according to claim 1 wherein said instants of intensity at at least one type of said two types of extrema points are minima.

5. A system according to claim 4 wherein:
    a. said film is a dielectric film transparent to said collimated light, and
    b. said substrate is a semiconductor wafer.

6. A system according to claim 1 wherein said light-sensitive means is responsive only to a narrow reflected beam.

7. A system according to claim 6 wherein the light-sensitive means is responsive only to light of selected wavelengths.

8. A monitoring system as claimed in claim 1 wherein said means for directing an incident beam directs said incident beam onto said surface at an angle greater than 75 degrees when measured from the normal to said surface.

9. A monitoring system as claimed in claim 8 wherein said light-sensitive means comprises:
    a. a bundle of optical fibers arranged to form a single input and a plurality of outputs for said polarized light,
    b. a plurality of optical filters, one associated with each of said plurality of outputs, each of said filters having a different peak wavelength response, and
    c. a plurality of photocells, one associated with each of said filters, for generating electrical signals of a magnitude proportional to the intensity of received light,
    whereby, substantially continuous discrete thickness indications are obtained.